US009431940B2

(12) United States Patent
Kameyama

(10) Patent No.: US 9,431,940 B2
(45) Date of Patent: Aug. 30, 2016

(54) MOTOR CONTROL APPARATUS FOR SENSORLESS MOTOR, AND IMAGE FORMING APPARATUS

(71) Applicant: CANON KABUSHIKI KAISHA, Tokyo (JP)

(72) Inventor: Shigeru Kameyama, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/547,267

(22) Filed: Nov. 19, 2014

(65) Prior Publication Data

US 2015/0145454 A1 May 28, 2015

(30) Foreign Application Priority Data

Nov. 26, 2013 (JP) ................................. 2013-244330

(51) Int. Cl.
*H02P 6/18* (2016.01)
*G03G 15/00* (2006.01)

(52) U.S. Cl.
CPC ........... *H02P 6/186* (2013.01); *G03G 15/5008* (2013.01); *H02P 6/182* (2013.01); *G03G 15/80* (2013.01)

(58) Field of Classification Search
CPC ... H02P 6/186; H02P 6/182; G03G 15/5008; G03G 15/80
USPC ....... 318/400.32, 701, 400, 42, 474, 400.01; 702/64, 65, 57
See application file for complete search history.

(56) References Cited

U.S. PATENT DOCUMENTS

| | | | | | |
|---|---|---|---|---|---|
| 5,793,179 | A | * | 8/1998 | Watkins | ................ H02P 25/083 318/701 |
| 6,172,498 | B1 | * | 1/2001 | Schmidt | ............... G01D 5/2006 318/685 |
| 6,570,358 | B2 | * | 5/2003 | Nakatsugawa | ........... H02P 6/16 318/490 |
| 7,015,664 | B2 | * | 3/2006 | Coles | ...................... H02P 6/185 318/400.01 |
| 7,072,778 | B2 | * | 7/2006 | Swanson | ................. H02P 6/185 702/57 |

(Continued)

FOREIGN PATENT DOCUMENTS

| JP | 11-122977 A | 4/1999 |
|---|---|---|
| JP | 2003-079184 A | 3/2003 |

(Continued)

*Primary Examiner* — Rita Leykin
(74) *Attorney, Agent, or Firm* — Fitzpatrick, Cella, Harper & Scinto

(57) ABSTRACT

A motor control apparatus includes a supply unit to supply a current for excitation to a plurality of coils of a motor, a first detection unit to detect a physical quantity which varies depending on a change in inductance of at least one of the plurality of coils, and a determination unit to determine a rotational position of a rotor of the motor. A control unit controls the rotational position of the rotor of the motor based on a determination result by the determination unit, and a second detection unit detects an inducted voltage of each of the plurality of coils. The determination unit also determines the rotational position of the rotor based on the detected physical quantity when the rotor is at rest and when a rotational speed of the rotor is smaller than or equal to a predetermined value, and determines the rotational position of the rotor based on the detected induced voltage when the rotational speed of the rotor is greater than the predetermined value.

18 Claims, 9 Drawing Sheets

(56) References Cited

U.S. PATENT DOCUMENTS

| | | | | |
|---|---|---|---|---|
| 7,099,136 B2* | 8/2006 | Seale | | F01L 9/04 123/90.11 |
| 7,298,106 B2* | 11/2007 | Yamamoto | | H02P 6/182 318/400.27 |
| 7,334,854 B1* | 2/2008 | Chang | | H02P 6/20 318/400.04 |
| 7,688,018 B2* | 3/2010 | Goto | | H02P 6/14 318/432 |
| 7,855,527 B2* | 12/2010 | Goto | | B60L 1/003 318/139 |
| 8,294,401 B2* | 10/2012 | Pollock | | H02P 6/10 318/400.32 |
| 8,497,648 B2* | 7/2013 | Tagome | | B60L 11/123 318/400.23 |
| 8,502,488 B2* | 8/2013 | Williams | | H02P 6/18 318/254.1 |
| 8,704,475 B2* | 4/2014 | Yamaguchi | | H02P 21/0003 318/376 |
| 9,007,004 B2* | 4/2015 | Hunter | | H02P 6/001 318/400.02 |
| 9,136,786 B2* | 9/2015 | McLean | | H02P 6/10 |
| 9,197,144 B2* | 11/2015 | Lin | | H02P 6/001 |
| 2004/0004455 A1* | 1/2004 | Fujimoto | | H02P 6/20 318/474 |
| 2005/0269982 A1* | 12/2005 | Coles | | H02P 6/185 318/400.05 |
| 2011/0204831 A1* | 8/2011 | Iwaji | | B60L 15/025 318/244 |
| 2012/0013282 A1* | 1/2012 | Introwicz | | H02P 6/186 318/400.06 |

FOREIGN PATENT DOCUMENTS

| | | |
|---|---|---|
| JP | 2004-040943 A | 2/2005 |
| JP | 2012-253991 A | 12/2012 |

* cited by examiner

F I G. 2A
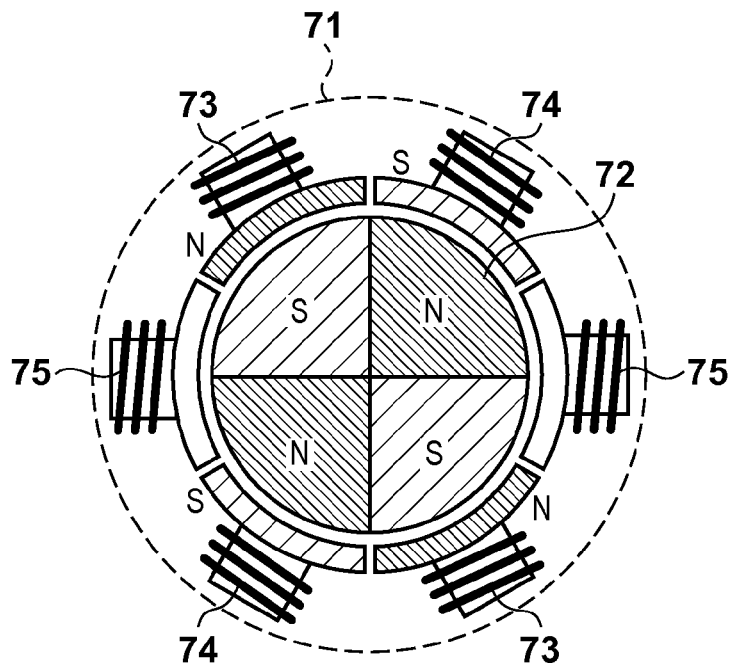
F I G. 2B
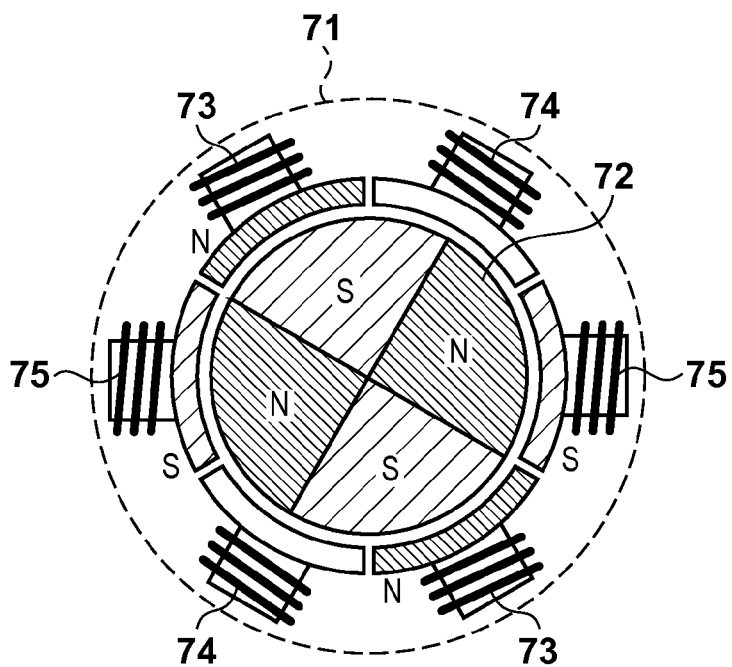

MOTOR CONTROL APPARATUS FOR SENSORLESS MOTOR, AND IMAGE FORMING APPARATUS

BACKGROUND OF THE INVENTION

1. Field of the Invention

The present disclosure relates to techniques of controlling a motor.

2. Description of the Related Art

As a drive source for a rotating member of an image forming apparatus, a brushless direct current (DC) motor, a brushed DC motor, a stepping motor, etc. are employed. Of these motors, the brushless DC motor typically has a Hall element, which is a sensor for detecting the position of the rotor. However, there is a sensorless brushless DC motor which does not have a Hall element as described in Japanese Patent Laid-Open No. 2003-79184.

In the sensorless brushless DC motor, the position of the rotor is detected based on an induced voltage. Therefore, when the motor is not operating, i.e., the induced voltage is absent, or when the motor is operating at low speed, i.e., the induced voltage is low, the position of the rotor cannot be detected, and therefore, an open-loop control is performed. Japanese Patent Laid-Open No. 2003-79184 describes a brushless DC motor which includes a single magnetometer and performs a drive control based on an output of the magnetometer during activation etc. However, in the configuration of Japanese Patent Laid-Open No. 2003-79184, the brushless DC motor requires the magnetometer and a magnetization pattern for the magnetometer, resulting in high cost.

SUMMARY OF THE INVENTION

According to an aspect of the present invention, a motor control apparatus includes: a supply unit configured to supply a current for excitation to a plurality of coils of a motor; a first detection unit configured to detect a physical quantity which varies depending on a change in inductance of at least one of the plurality of coils; a determination unit configured to determine a rotational position of a rotor of the motor based on the physical quantity detected by the first detection unit; and a control unit configured to control the rotational position of the rotor of the motor based on a determination result by the determination unit.

Further features of the present invention will become apparent from the following description of exemplary embodiments with reference to the attached drawings.

BRIEF DESCRIPTION OF THE DRAWINGS

FIGS. 2A and 2B are diagrams showing a structure of a motor according to one embodiment.

DESCRIPTION OF THE EMBODIMENTS

Illustrative embodiments of the present invention will now be described with reference to the accompanying drawings. Note that, in the figures described below, parts which are not required for description of the embodiments are not shown. Also, the embodiments described below are only for illustrative purposes and are not intended to limit the present invention.

<First Embodiment>

Figure 3A:
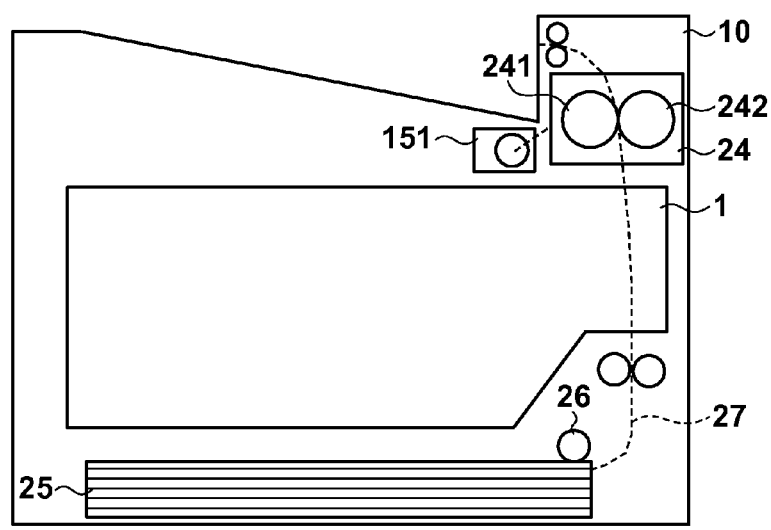
FIGS. 3A and 3B are diagrams showing a configuration of an image forming apparatus according to one embodiment.

FIG. 3A shows an image forming apparatus 10 according to this embodiment, such as a printer, a copier, a multifunction peripheral, or a fax machine. The image forming apparatus 10 includes an image forming unit 1 including formation units for forming respective toner images of yellow, magenta, cyan, and black. The formation unit of each color has a photosensitive member, an exposure unit, a development unit, etc. The exposure unit scans the photosensitive member which has been charged, using light, to form an electrostatic latent image, and the development unit develops the electrostatic latent image using toner to form a toner image having a corresponding color. On the other hand, a recording material in a cassette 25 is fed to a conveyance path 27 by a paper feed roller 26. The image forming unit 1 transfers the toner images formed on the photosensitive members to the recording material conveyed in the conveyance path 27. Note that the toner images on the photosensitive members are transferred to the recording material with the toner images being superimposed together, thereby forming a multicolor toner image. Thereafter, the recording material is conveyed to a fixing unit 24 including a heat roller 241 and a pressure roller 242. The fixing unit 24 applies heat and pressure to the recording material to fix the toner image to the recording material. Note that a motor 151 drives and rotates the heat roller 241 and the pressure roller 242 of the fixing unit 24, for example.

Note that, during printing, i.e., when an image is formed on a recording material, the heat roller 241 and the pressure roller 242 are made to contact each other with a predetermined pressure, and are caused to rotate in the forward direction in accordance with the conveyance direction of the conveyance path 27. On the other hand, when printing is not being performed, the heat roller 241 and the pressure roller 242 are controlled to be separate from each other. The heat roller 241 and the pressure roller 242 are in contact with or separated from each other by the motor 151 being rotated in a direction opposite to that during printing and thereby a contact/separation cam (not shown) being driven through a one-way clutch. For this contact/separation operation, the motor 151 is controlled to rotate in the opposite direction, and a position of the motor 151 is controlled based on an output of a position sensor of the contact/separation cam.

Figure 3B:
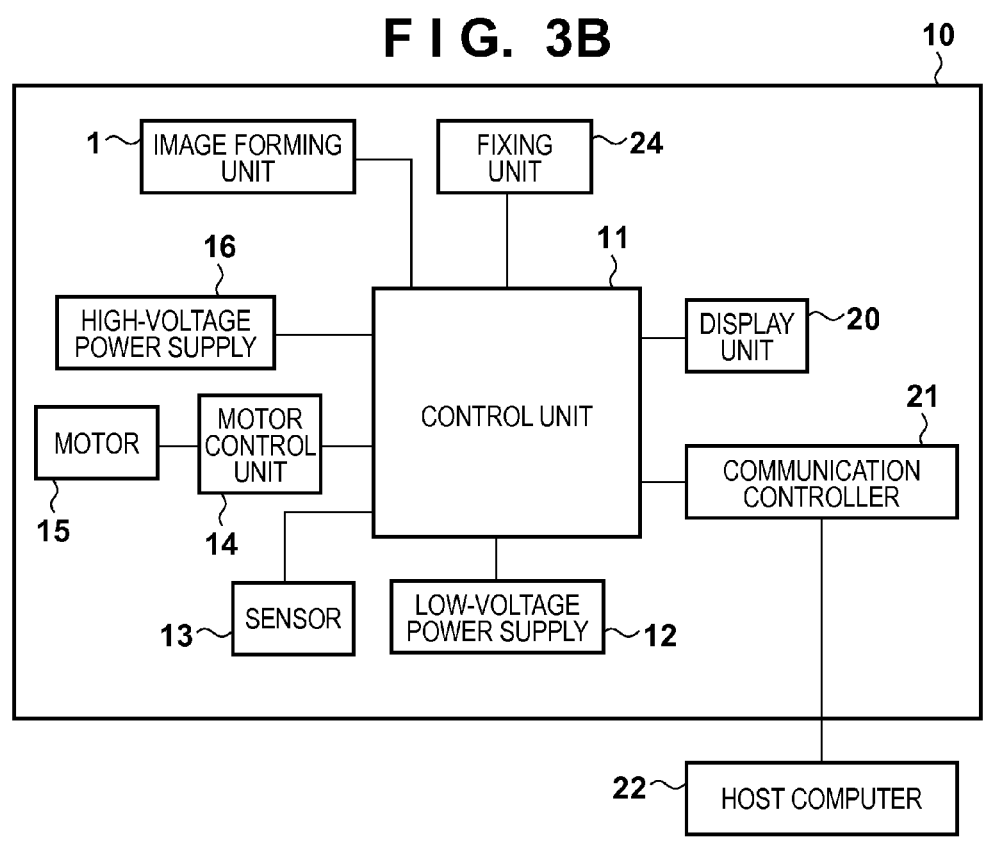

FIG. 3B shows a control configuration of the image forming apparatus 10 of this embodiment. A control unit 11 controls the entire image forming apparatus 10. For example, the control unit 11, which has a processor, performs various controls in accordance with control programs, data, etc. stored in a memory of the control unit 11. A high-voltage power supply 16 generates and supplies relatively high voltages, such as a charge bias for the photosensitive member, a development bias for development, etc., to the image forming unit 1 etc. On the other hand, a low-voltage power supply 12 generates and supplies relatively low voltages required by parts of the image forming apparatus 10. A sensor 13 includes at least one sensor for detecting states of parts of the image forming apparatus 10. A motor control unit 14 controls motors 15 in accordance with instructions from the control unit 11. Note that the motors 15 are at least one motor included in the image forming apparatus 10, including the motor 151. A display unit 20 displays a state of an operation of the image forming apparatus 10 for the user. A communication controller 21 performs a communication process with a host computer 22 which transfers image data to be printed to the image forming apparatus 10.

Figure 1:
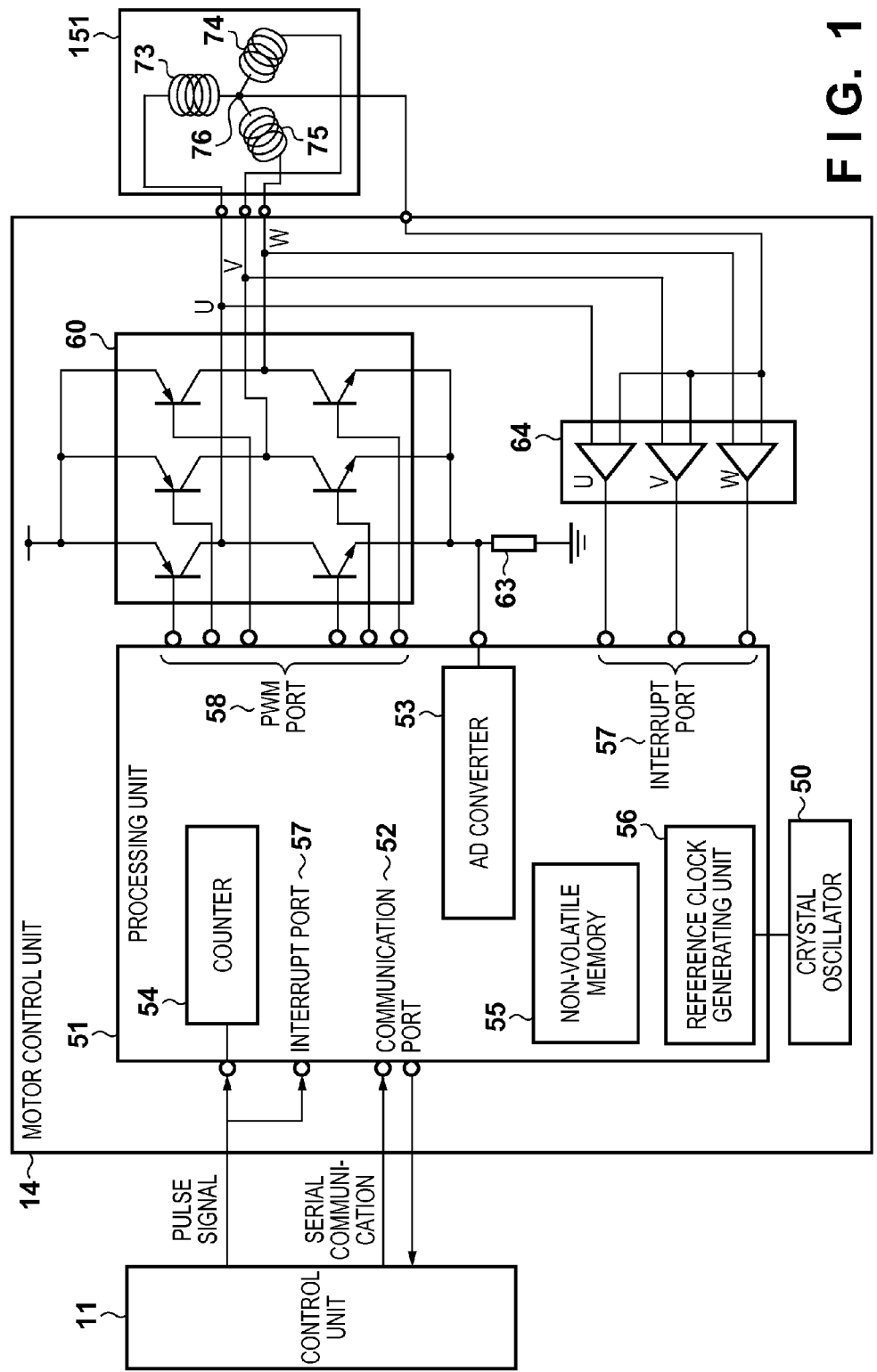
FIG. 1 is a diagram showing a control configuration of a motor according to one embodiment.

Next, a configuration of the motor control unit 14 which controls the motor 151 etc. will be described with reference to FIG. 1. Although, in this embodiment, the motor control unit 14 is a part of the image forming apparatus 10 and therefore referred to as such in the following description, the motor control unit 14 may be regarded as a single apparatus and referred to as a motor control apparatus. An apparatus including the control unit 11 and the motor control unit 14 may be referred to as a motor control apparatus. The motor control unit 14 includes a processing unit 51 implemented by, for example, a microcomputer. The processing unit 51 has a reference clock generating unit 56 which generates a reference clock based on a signal from a crystal oscillator 50. The processing unit 51 has a counter 54 which counts a pulse signal from the control unit 11 using the reference clock, and based on the count value, manages the period and duration of the input pulse. Also, the processing unit 51, when receiving a signal at an interrupt port 57, uses the signal as a trigger to perform an interrupt process corresponding to the interrupt port 57. A communication port 52 performs serial data communication with the control unit 11. A pulse width modulation (PWM) port 58 outputs a PWM signal for driving the switching devices of a three-phase inverter 60.

The switching devices of the three-phase inverter 60, which are, for example, a FET, are driven by the PWM signal to supply currents for exciting a plurality of coils 73 (U phase), 74 (V phase), and 75 (W phase) of the motor 151. Thus, the three-phase inverter 60 operates as a unit for supplying currents for driving the motor 151. The current supplied to each of the coils 73, 74, and 75 is converted into a voltage by a resistance 63, and the voltage is input as a value indicating an exciting current to an AD converter 53 of the processing unit 51. A comparator 64 of the motor control unit 14 compares a voltage of a neutral point 76 which is a connection point where the coils 73, 74, and 75 are connected together, with voltages of the other ends of the coils 73, 74, and 75, and outputs the result of the comparison to the interrupt port 57 of the processing unit 51. In other words, the comparator 64 outputs a signal indicating the direction of an induced voltage of each of the coils 73, 74, and 75, to the processing unit 51. Note that a filter may be provided at an input portion of the comparator 64 as appropriate. Instead of using the comparator 64, the processing unit 51 may compare voltages at both ends of each of the coils 73, 74, and 75. A non-volatile memory 55 is a storage unit which stores data etc. used in the process of the processing unit 51.

Next, a structure of the motor 151 will be described with reference to FIGS. 2A and 2B. In this embodiment, the motor 151 has a six-slot stator 71 and a four-pole rotor 72. The stator 71 includes the coils 73, 74, and 75 having three phases (U, V, and W). The rotor 72 includes permanent magnets and has two N poles and two S poles. A rest position (a rotational phase at rest) of the rotor 72 is determined by a combination of the excited coils 73, 74, and 75, i.e., excitation phases. In the description that follows, the term "excitation" with respect to an X-Y phase means that excitation is performed so that the X phase provides the N pole and the Y phase provides the S pole. For example, when the U-V phase is excited, the U phase (coil 73) provides the N pole and the V phase (coil 74) provides the S pole, and therefore, the rotor 72 is at rest in a position shown in FIG. 2A. Next, when the U-W phase is excited, the U phase (coil 73) provides the N pole and the W phase (coil 75) provides the S pole, and therefore, the rotor 72 is at rest in a position shown in FIG. 2B. In the description that follows, that the rotor 72 is moved from one position to another position immediately adjacent to that position, e.g., from the position of FIG. 2A to the position of FIG. 2B, is expressed by "the rotor 72 is moved by one step" or "the rotor 72 is advanced by one step."

Next, detection of the rest position (rotational position) of the rotor 72 when the motor 151 is at rest will be described. In this embodiment, the rest position of the rotor 72 is detected by utilizing a change in inductance of each of the coils 73, 74, and 75 which depends on the rest position of the rotor 72. Typically, the coil is a copper wire which is wrapped around a laminated core including electromagnetic steel sheets. When an external magnetic field is present, the magnetic permeability of the electromagnetic steel sheet is reduced, and therefore, the inductance of the coil, which is proportional to the magnetic permeability of the core, is also reduced.

For example, as shown in FIG. 2A, it is assumed that the rotor 72 is at rest with only the S poles of the rotor 72 facing the U-phase coils 73. In this case, the external magnetic field of the rotor 72 has a significant influence, and therefore, the reduction rate of the inductance of the coil 73 increases. The inductance reduction rate is also changed, depending on the direction of a current flowing through the U-phase coil 73. Specifically, when the direction of a magnetic field caused by a current flowing through the coil 73 is caused to be the same as the direction of the external magnetic field of the rotor 72, the inductance reduction rate is larger than when these directions are opposite to each other. Therefore, in the case of FIG. 2A, the inductance reduction rate is larger when the U phase (coil 73) is excited into the N pole than when the U phase (coil 73) is excited into the S pole.

Figure 4A:
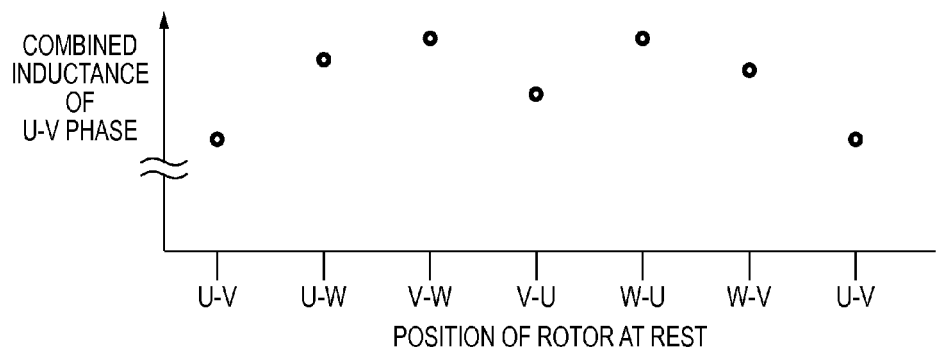
FIGS. 4A to 4C are diagrams for describing detection of a position of a rotor when the rotor is at rest or when the rotor is operating at low speed, according to one embodiment.

On the other hand, in the state of FIG. 2A, the W phase (coil 75) faces both the S and N poles of the rotor 72. Therefore, the external magnetic field of the rotor 72 has less influence, and therefore, the reduction rate of the inductance of the coil 75 decreases. Thus, the inductance of each of the coils 73, 74, and 75 has different values, depending on the rest position of the rotor 72. FIG. 4A shows a relationship between the rest positions of the rotor 72 and combined inductances of the U-V phase, which is one excitation phase. Note that, in the description of FIG. 4A and thereafter, it is assumed that the rest position of the rotor 72 is indicated by the excitation phase. The combined inductance of the U-V phase means a combined inductance of the coils 73 and 74 which is measured when currents are caused to flow so that the U phase provides the N pole and the V phase provides the S pole.

Figure 4B:
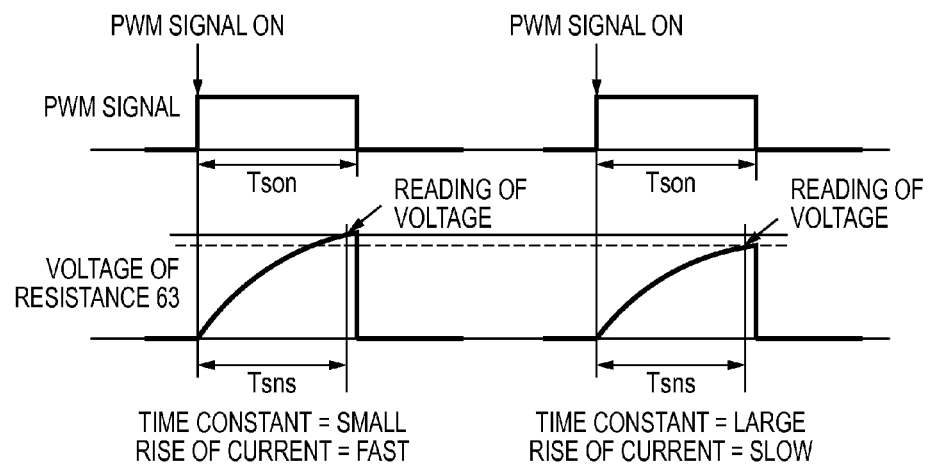

In this embodiment, the inductance is detected by detecting a physical quantity which varies depending on a change in the inductance. For example, the rate at which a current rises when the current flows a coil varies depending on the value of the inductance, and therefore, this rise rate is measured. Specifically, as shown in FIG. 4B, the processing unit 51 causes the PWM signal to be in the ON state during a predetermined period of time Tson. After a predetermined period of time (Tsns) has elapsed since the processing unit 51 caused the PWM signal to be in the ON state and thereby applied a voltage to a coil, an AD converter 53 (first detection unit) is used to detect a voltage occurring in the resistance 63 of FIG. 1, whereby the rise rate can be measured. Note that the predetermined period of time Tson refers to a period of time during which the rotor 72 is not moved by a generated torque.

A relationship between the rest position of the rotor 72, the excitation phase carrying a current, and the voltage occurring across the resistance 63, may be previously obtained and stored in a non-volatile memory 55. The control unit 11 may also control the motor control unit 14 so that the motor control unit 14 measures and stores this relationship to the non-volatile memory 55. A technique of measuring this relationship will now be described. The processing unit 51 excites a first excitation phase corresponding to the current rotational position of the rotor 72 during a predetermined period of time Tdon, and then, excites a second excitation phase which is provided by moving the rotor 72 by one step from the first excitation phase during the predetermined period of time Tdon. Here, the period of time Tdon is longer than or equal to a period of time during which the vibration of the rotor 72 which occurs due to its movement substantially stops. By the above operation, the rotor 72 comes to rest in a position corresponding to the second excitation phase. In this state, for each excitation phase (U-V, U-W, V-W, V-U, W-U, and W-V), a voltage occurring across the resistance 63 is measured as described above. Specifically, for each excitation phase, the PWM signal is caused to be in the ON state during the period of time Tson, and the voltage of the resistance 63 is measured after the period of time Tsns has elapsed since the PWM signal was caused to be in the ON state.

Figure 4C:
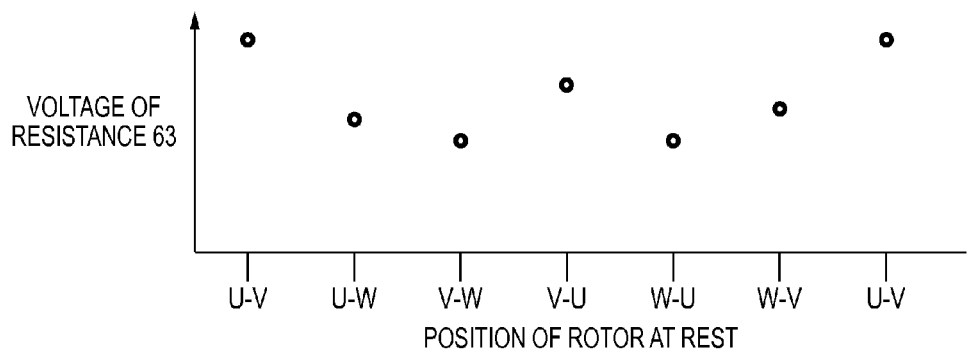

Next, the processing unit 51 further moves the rotor 72 by one step, and measures a voltage occurring across the resistance 63 for each excitation phase. This process is performed for all rest positions of the rotor 72 (in this example, for each of six rest positions), whereby the relationship between the rest positions of the rotor 72, the excitation phases, and the voltages of the resistance 63 can be measured. Note that the measured relationship is stored in the non-volatile memory 55 of the processing unit 51. FIG. 4C shows a relationship between each rest position of the rotor 72, and a voltage occurring across the resistance 63 when a current is caused to flow through the U-V phase. As shown in FIG. 4C, the voltage occurring across the resistance 63 when a current is caused to flow through the U-V phase has a maximum value when the rest position of the rotor 72 corresponds to the position of the U-V phase. Thus, the voltage occurring across the resistance 63 varies depending on the rest position of the rotor 72, and therefore, the processing unit 51 can determine the rest position of the rotor 72 based on the voltage of the resistance 63. Specifically, for example, the voltage of the resistance 63 occurring after a predetermined period of time has elapsed since a current was caused to flow through at least one excitation phase is measured, and the current rest position of the rotor 72 can be determined based on the information stored in the non-volatile memory 55. Thus, the processing unit 51 operates as a determination unit for determining the rotational position of the rotor 72. The processing unit 51 also operates as a measurement unit for measuring the relationship between the rest position of the rotor 72, the excitation phase, and the voltage of the resistance 63.

Note that the above measurement of the relationship may, for example, be performed during an initialization sequence after the image forming apparatus is turned on. Alternatively, because the value of a current to the motor 151 may be changed due to a change in the ambient temperature, the temperature of the motor 151, the voltage of each part of the image forming apparatus, etc., the measurement of the relationship may be performed at predetermined intervals or each time a predetermined number of sheets have been printed. Still alternatively, the measurement may be performed when the ambient temperature changes by at least a predetermined value. Still alternatively, each time the position of the rotor 72 is detected, the relationship between the position of the rotor 72 and the voltage occurring across the resistance 63 may be updated based on the result of the detection.

Figure 5:
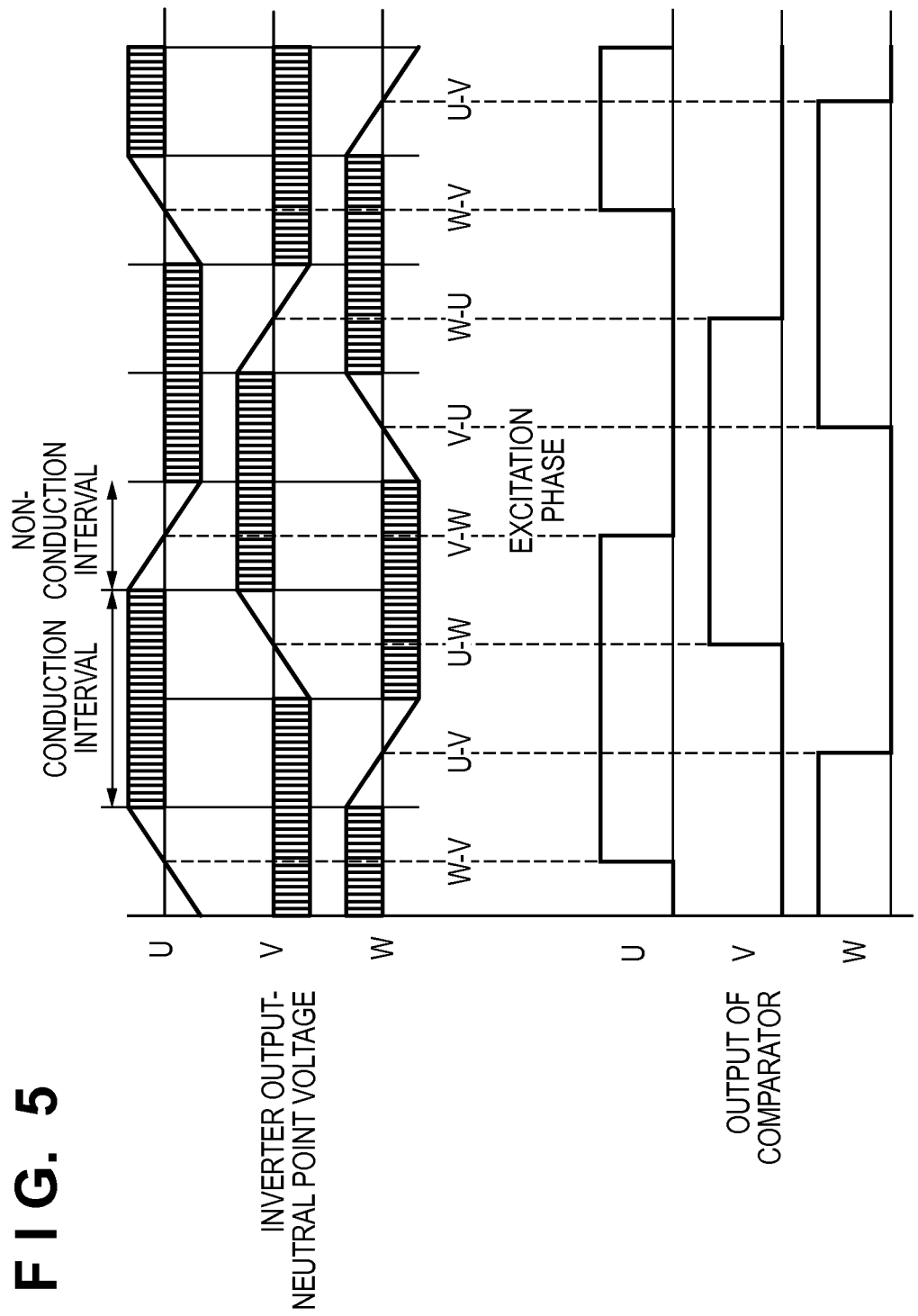
FIG. 5 is a diagram for describing detection of a position of a rotor when the rotor is rotating at high speed, according to one embodiment.

Next, detection of the position of the rotor 72 which is performed when the motor 151 is rotating at a rotational speed which causes a sufficient induced voltage to occur in each of the coils 73, 74, and 75, will be described with reference to FIG. 5. In FIG. 5, an inverter output-neutral point voltage indicates an outline of a change over time of a voltage occurring across each of the coils 73 (U phase), (V phase), and 75 (W phase) when 120-degree conduction is performed. A comparator output indicates the output of the comparator 64 of FIG. 1. The processing unit 51 can determine the rotational position of the rotor 72 based on rise and fall points of the output of the comparator 64 (second detection unit).

Next, a motor control method according to this embodiment will be described. In this embodiment, the control unit 11 notifies the motor control unit 14 of an operation mode using serial communication. In this embodiment, the operation mode specified by the control unit 11 includes two modes, i.e., a position control mode and a speed control mode. In the position control mode, the motor control unit 14 performs a position control each time the motor control unit 14 receives a reference pulse from the control unit 11. In the speed control mode, the motor control unit 14 controls the motor 151 so that the motor 151 rotates at a speed corresponding to the period of the reference pulse received from the control unit 11.

Figure 6:
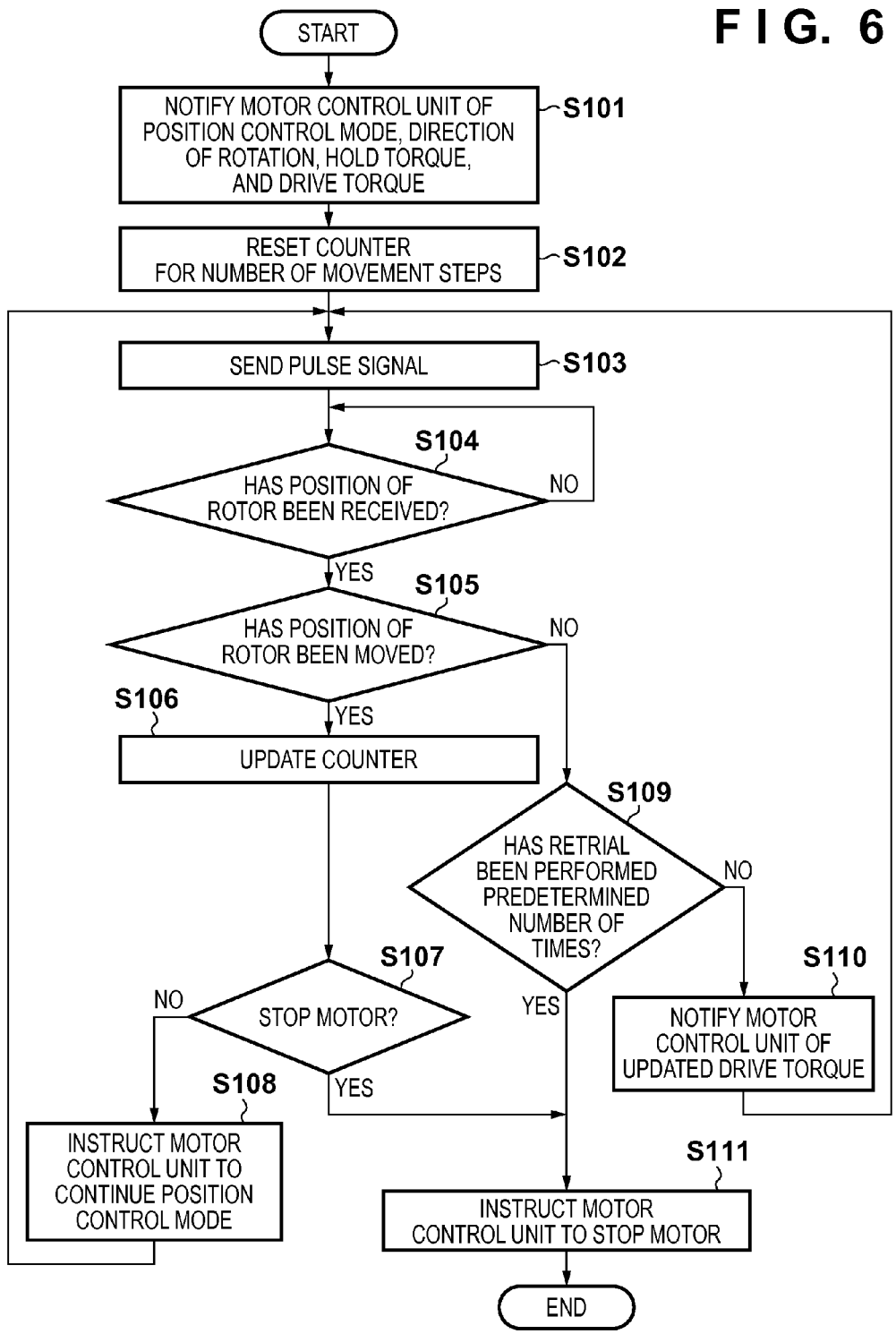
FIG. 6 is a flowchart of a process of a control unit in a position control mode according to one embodiment.

Firstly, processes of the control unit 11 and the motor control unit 14 in the position control mode will be described with reference to flowcharts of FIGS. 6 and 7. Initially, in step S101 of FIG. 6, the control unit 11 notifies the motor control unit 14 of the position control mode using serial communication. At this time, the control unit 11 also notifies the motor control unit 14 of the direction of rotation, a hold torque, and a drive torque. Note that the hold torque is at a level which does not cause the rotor 72 to move, and the drive torque is at a level which causes the rotor 72 to rotate. Thereafter, the control unit 11 resets a counter which counts the number of movement steps in step S102, and sends a pulse signal to the motor control unit 14 in step S103.

Figure 7:
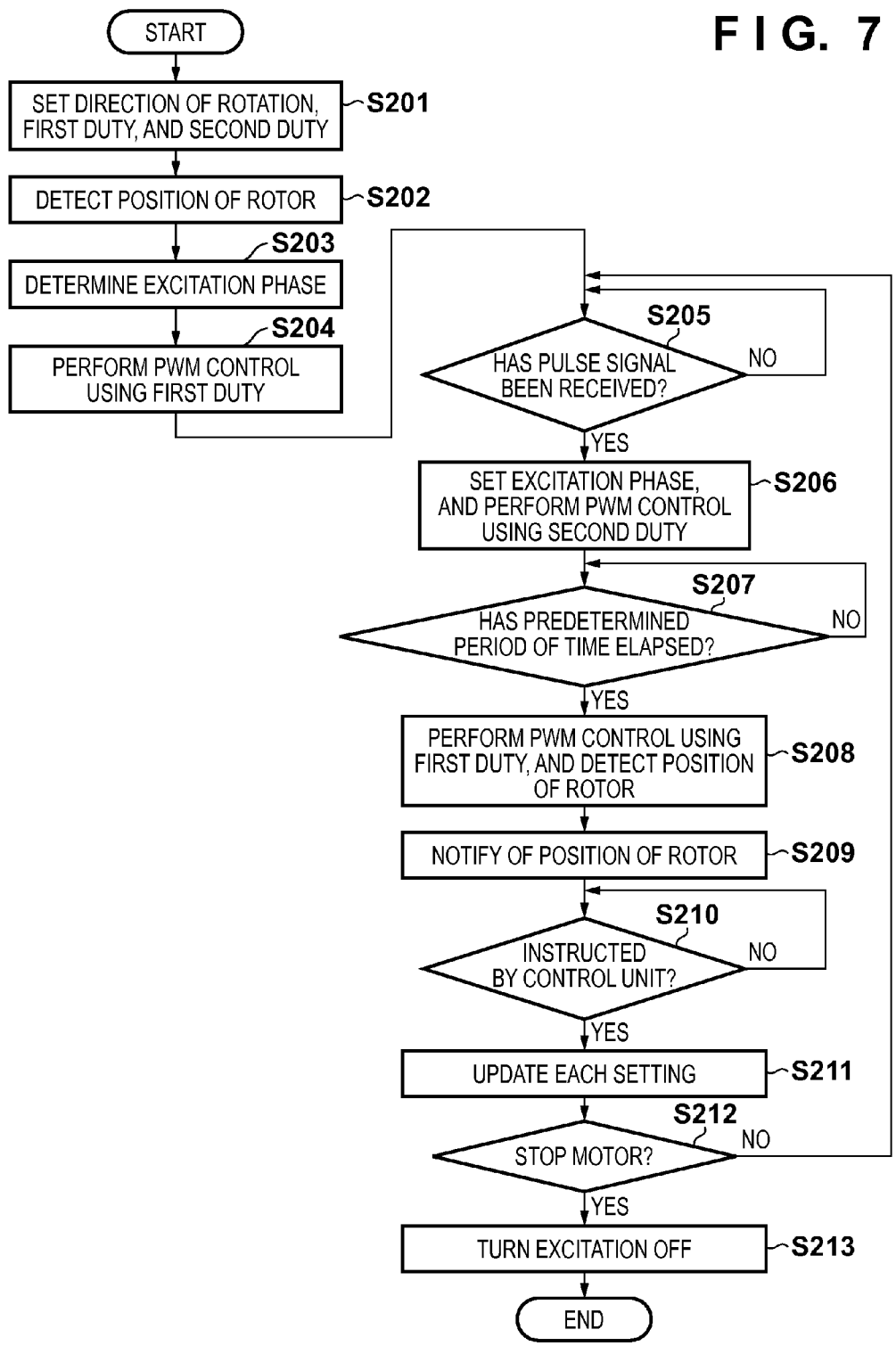
FIG. 7 is a flowchart of a process of a motor control unit in a position control mode according to one embodiment.

On the other hand, the motor control unit 14, when notified of the position control mode by the control unit 11, transitions to the position control mode, and in step S201 of FIG. 7, sets the specified direction of rotation. In step S201, the motor control unit 14 also sets a first duty which is the duty ratio of the PWM signal for establishing the specified hold torque, and a second duty for establishing the specified drive torque. Next, in step S202, the motor control unit 14 performs the detection of the rest position of the rotor 72 described above with reference to FIG. 4B. In step S203, the motor control unit 14 determines an excitation phase for fixing the rotor 72 to the detected rest position, and in step S204, causes a current to flow through the determined excitation phase. Note that the PWM control in this case is performed in accordance with the first duty corresponding to the hold torque. Thereafter, in step S205, the motor control unit 14 waits until it has received a pulse signal from the control unit 11. The motor control unit 14, when receiving the pulse signal, sets the excitation phase in step S206 so that the rotor 72 is moved by one step in the set direction of rotation, and performs a PWM control using the second duty corresponding to the drive torque.

The motor control unit 14 waits in step S207 until the predetermined period of time Tdon has elapsed, and after the period of time Tdon has elapsed, changes the duty to the first duty to fix the rotor 72 and detects the position of the rotor 72 in step S208. Note that the predetermined period of time Tdon is assumed to be longer than or equal to a period of time during which the vibration of the rotor 72 which occurs due to its movement substantially stops. The motor control unit 14 notifies the control unit 11 of the detected position of the rotor 72 in step S209, and waits in step S210 until it has received an instruction from the control unit 11. The motor control unit 14, when receiving an instruction from the control unit 11 in step S210, updates the settings in accordance with the instruction in step S211. Note that, here, the instruction from the control unit 11 includes an instruction to continue or end the position control mode (stop the motor), an instruction to change the direction of rotation, the hold torque, or the drive torque, etc. Note that, in step S212, the motor control unit 14 determines whether or not it has received the instruction to end the position control mode, i.e., the instruction to stop the motor. If the result of the determination is positive, the motor control unit 14 stops exciting and ends the process in step S213. Otherwise, the motor control unit 14 repeats the process from step S205.

Referring back to FIG. 6, after sending the pulse signal in step S103, the control unit 11 waits in step S104 until it has received information indicating the rotor position from the motor control unit 14. The control unit 11, when receiving the information indicating the rotor position, determines whether or not the rotor position has been moved by one step, in step S105. If the result of the determination is positive, the control unit 11 updates the counter in step S106. Thereafter, in step S107, the control unit 11 determines whether or not to stop the motor 151. If the result of the determination is positive, the control unit 11 instructs the motor control unit 14 to stop the motor 151 in step S111. Note that, the control unit 11 determines whether or not to stop the motor 151, for example, based on whether or not the rotor 72 has been rotated by a desired number of steps, whether or not the rotor 72 has been moved to a desired position, etc. When the control unit 11 determines to continue moving the motor 151, the control unit 11 instructs the motor control unit 14 to continue the position control mode in step S108, and repeats the process from step S103.

On the other hand, if, in step S105, the control unit 11 determines that the rotor 72 has not been rotated, the control unit 11 determines whether or not retrial has already been performed a predetermined number of times, in step S109. If the number of times of retrial has not reached the predetermined number of times, the control unit 11 updates and increases the drive torque of which the motor control unit 14 has been notified, and notifies the motor control unit 14 of the updated drive torque, in step S110. Thereafter, the control unit 11 repeats the process from step S103 (retrial). The control unit 11, when, in step S109, determining that the updating of the drive torque of S110 due to the absence of the movement of the rotor has been performed the predetermined number of times, determines that the motor 151 is abnormal, and instructs the motor control unit 14 to stop the motor 151 in step S111.

Figure 8:
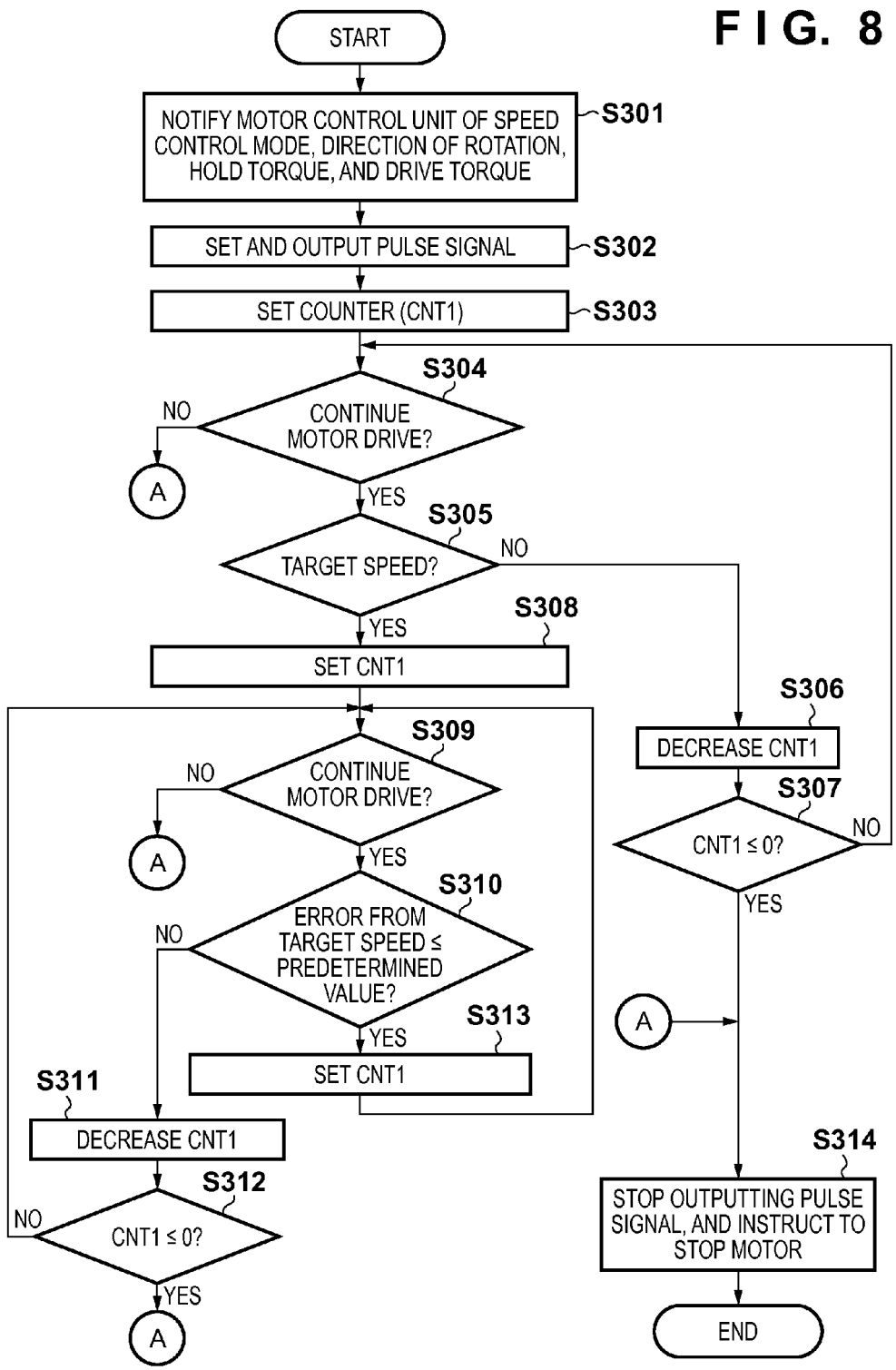
FIG. 8 is a flowchart of a process of a control unit in a speed control mode according to one embodiment.

Next, processes of the control unit 11 and the motor control unit 14 in the speed control mode will be described with reference to flowcharts of FIGS. 8 and 9. Initially, in step S301 of FIG. 8, the control unit 11 notifies the motor control unit 14 of the speed control mode. At this time, the control unit 11 also notifies the motor control unit 14 of the direction of rotation, a hold torque, and a drive torque. In addition, the control unit 11 may notify the motor control unit 14 of a gain setting of a control loop etc. Thereafter, the control unit 11 sets and outputs a pulse signal having a period corresponding to the rotational speed of the rotor 72 in step S302, and sets a counter CNT1 for time out to a value T1 in S303. Here, the set value T1 of the counter CNT1 is assumed to be greater than or equal to a time required to accelerate the motor 151 to a target rotational speed.

Figure 9:
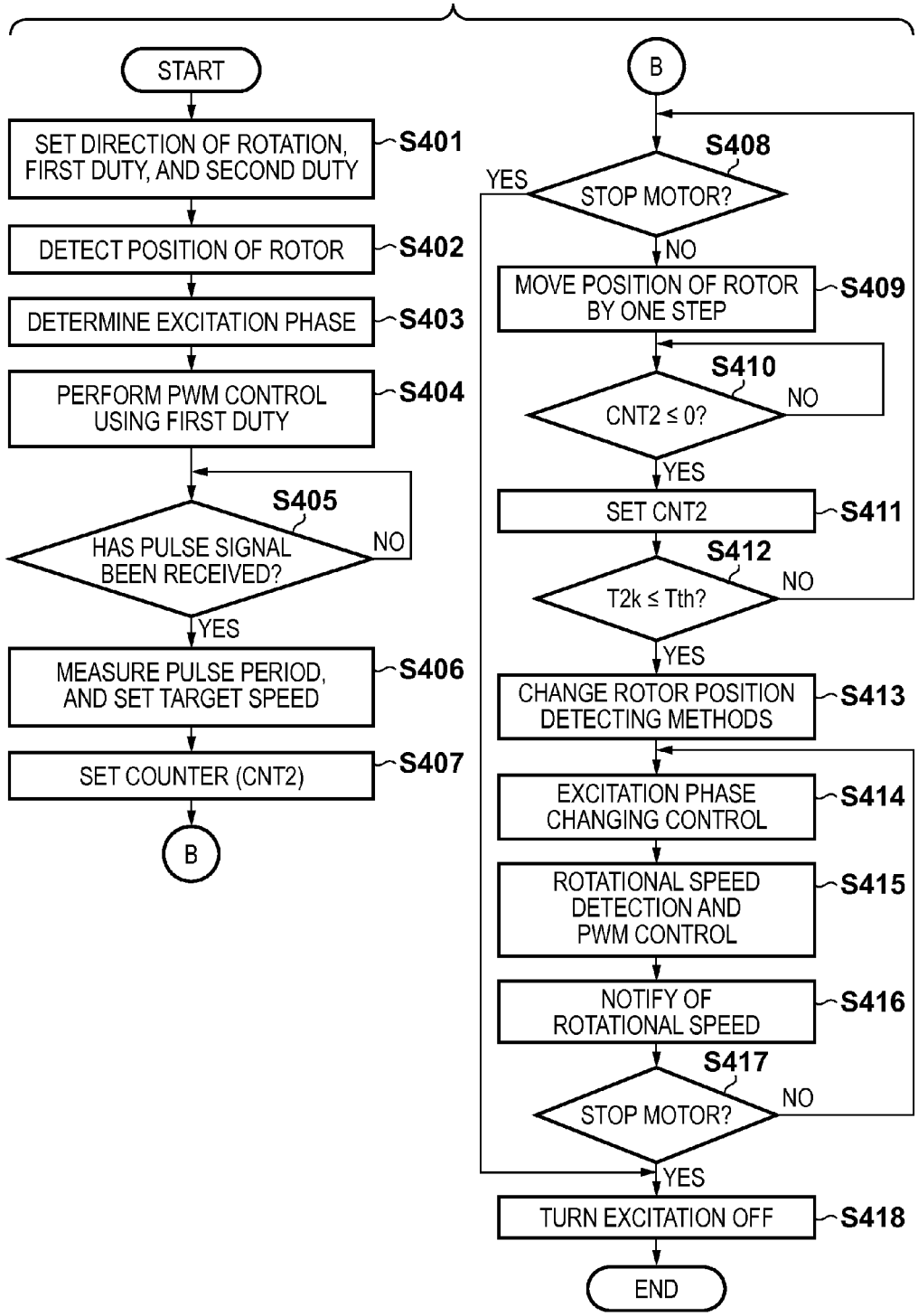
FIG. 9 is a flowchart of a process of a motor control unit in a speed control mode according to one embodiment.

On the other hand, the motor control unit 14, when notified of the speed control mode by the control unit 11, transitions to the speed control mode, and sets the specified direction of rotation in step S401 of FIG. 9. In step S401, the motor control unit 14 also sets a first duty which is the duty ratio of the PWM signal for establishing the specified hold torque, and a second duty for establishing the specified drive torque. Next, in step S402, the motor control unit 14 performs the detection of the rest position of the rotor 72 described above with reference to FIG. 4B. In step S403, the motor control unit 14 determines an excitation phase for fixing the rotor 72 to the detected rest position, and in step S404, causes a current to flow through the determined excitation phase. Note that the PWM control in this case is performed in accordance with the first duty corresponding to the hold torque.

The motor control unit 14 waits until it has received a pulse signal from the control unit 11, in step S405. When receiving the pulse signal, the motor control unit 14 measures the period of the pulse signal, determines a target speed, and sets the determined target speed in S406. Thereafter, in step S407, the motor control unit 14 sets a counter CNT2 to a predetermined value T21. Here, the value T21 is assumed to represent a time which is long enough to cause the rotor 72 to move by one step. In step S408, the motor control unit 14 determines whether or not it has been instructed to stop the motor 151. If the result of the determination is positive, the motor control unit 14 stops excitation in step S418. Otherwise, the motor control unit 14 moves the rotor 72 by one step in the set direction of rotation in step S409. Thereafter, the motor control unit 14 waits until the value of the counter CNT2 has reached zero, while reducing the value of the counter CNT2, depending on the elapsed time, in step S410. When the value of the counter has reached zero, the motor control unit 14 sets the counter CNT2 to a value T22. Here, the value T22 also represents a time which is long enough to cause the rotor 72 to move by one step. Because the time required for the one-step movement gradually decreases due to acceleration of the rotor 72, the value T22 is assumed to be smaller than the value T21. Thereafter, in step S412, the motor control unit 14 determines whether or not the value T22 of the counter CNT2 set in step S411 is smaller than or equal to a predetermined threshold Tth. If the result of the determination is negative, the motor control unit 14 repeats the process from step S408. Note that when steps S408 to S412 are repeated, the value of T2k of the counter CNT2 set in step S411 is smaller than the value T2(k−1) of the counter CNT2 immediately previously set in step S411. The threshold Tth is set to a predetermined value of a rotational speed at which the position detection is allowed based on the induced voltage as described above with reference to FIG. 5, or a value greater than the predetermined value, which is previously stored in the non-volatile memory 55. The change rate of the subsequent value of the counter CNT2 set in step S411 from the initial value T21 of the counter CNT2 is set to a value which provides a sufficient torque of the motor 151 to drive the load so that the rotor 72 can be normally accelerated, and is previously stored in the non-volatile memory 55.

If, in step S412, determining that the value of the counter CNT2 is smaller than or equal to the threshold Tth, the motor control unit 14 changes the position detection of the motor 151 so that the position detection is performed based on the output waveform of the comparator 64, in step S413. Thereafter, in step S414, the motor control unit 14 changes the excitation phases, depending on the position of the rotor 72, and in step S415, detects the rotational position of the rotor 72, calculates the rotational speed of the rotor 72 based on a change in the rotational position, and performs a PWM control to achieve a target rotational speed. In step S416, the motor control unit 14 notifies the control unit 11 of the rotational speed of the rotor 72. In step S417, the motor control unit 14 determines whether or not it has been instructed by the control unit 11 to stop the motor 151. If the result of the determination is positive, the motor control unit 14 stops excitation in step S418. Otherwise, the motor control unit 14 repeats the process from step S414.

Note that, in the control of steps S414 to S416, the motor control unit 14 can perform the following control in parallel. Initially, the period of the pulse signal is set to coincide with the period of changing of the excitation phases. Also, the value of a counter CNT3 is incremented by one every edge of the pulse signal. Also, when the rotor 72 is moved by one step, the value of the counter CNT3 is decremented by one. By such a configuration, the value of the counter CNT3 can be used as position error information. This position error information is multiplied by a predetermined gain, and the product is added to the target speed, so that the target speed is modified, depending on the amount of a position error. Specifically, if the value of the counter CNT3 is positive, this indicates that the actual position occurs later than the target position. In this case, the target speed increases, which acts to eliminate or reduce the delay of the position. Conversely, if the value of the counter CNT3 is negative, this indicates that the actual position occurs earlier than the target position. In this case, the target speed decreases, which acts to eliminate or reduce the advance of the position.

Referring back to FIG. 8, the control unit 11 sets the counter CNT1 to the value T1 in step S303, and thereafter, in step S304, determines whether to cause the motor 151 to continue or end rotating. If determining to cause the motor 151 to end rotating, the control unit 11 stops outputting the pulse signal, and instructs the motor control unit 14 to stop the motor 151, in step S314. On the other hand, if determining to cause the motor 151 to continue rotating, the control unit 11 determines whether or not the rotational speed of the rotor 72 received from the motor control unit 14 has reached the target speed, in step S305. If the result of the determination is negative, the control unit 11 repeats the process from step S304 until the value of the counter CNT1 has reached zero, while decreasing the value of the counter CNT1 by the elapsed time, in step S306. If the rotational speed of the rotor 72 has not reached the target speed even when the value of the counter CNT1 has reached zero, the result of the determination in step S307 is positive ("YES"). In this case, the control unit 11 determines that the motor 151 is abnormal, and stops the motor 151 in step S314.

On the other hand, if the rotational speed of the rotor 72 has reached the target speed within the period of time T1, the result of the determination in step S305 is positive ("YES"). In this case, the control unit 11 sets the counter CNT1 to a value T3 in step S308. The value T3 is set so that when a failure etc. occurs, the operation can be quickly stopped, e.g., about one second. In step S309, the control unit 11 determines whether to cause the motor 151 to continue or end rotating. If determining to cause the motor 151 to end rotating, the control unit 11 stops the motor 151 in step S314. On the other hand, if determining to cause the motor 151 to continue rotating, the control unit 11 determines whether or not an error between the rotational speed of the rotor 72 received from the motor control unit 14 and the target speed is smaller than or equal to a predetermined value, in step S310. If the result of the determination is positive, the control unit 11 sets the counter CNT1 to the value T3 in step S313, and repeats the process from step S309. Otherwise, the control unit 11 determines whether or not the error of the rotational speed of the rotor 72 has been smaller than or equal to the predetermined value during the period of time T3, while decreasing the value of the counter CNT1, in step S311. If the error has continued to be greater than the predetermined value during the period of time T3, the result of the determination in step S312 is positive ("YES"). In this case, the control unit 11 determines that the motor 151 is abnormal, and stops the motor 151 in step S314.

Thus, by detecting a physical quantity which varies depending on a change in the inductance of a coil in an excitation phase, the position of the rotor 72 can be detected when the rotor 72 is at rest or is rotating at low speed, without providing a magnetometer. Although the above embodiment has been described by illustrating the motor 151 which drives the fixing unit 24, the present invention is similarly applicable to other motors for rotating rotating members of an image forming apparatus. The configuration of the motor 151 shown in FIGS. 2A and 2B is only for illustrative purposes, and other motors having different number of poles may be used.

<Second Embodiment>

Next, a second embodiment, mainly differences from the first embodiment, will be described. For example, when the rotor 72 is in the state of FIG. 2A, the combined inductance of the U-V phase is minimum, and the voltage of the resistance 63 which occurs when the U-V phase is excited during a predetermined period of time is maximum. Thereafter, for example, when the rotor 72 is moved by one step into the state of FIG. 2B, the voltage of the resistance 63 which occurs when the U-V phase is excited during the predetermined period of time is reduced compared to the state of FIG. 2A. Therefore, in a certain state, there is a difference between the voltage of the resistance 63 detected when a certain phase is excited and the voltage of the resistance 63 detected when that phase is excited after the rotor 72 has been moved by one step. Therefore, by detecting a change in the voltage of the resistance 63 detected when the same phase is excited, the one-step movement of the rotor 72 can be determined.

<Third Embodiment>

In the second embodiment, the movement of the rotor 72 is determined based on a change in the voltage of the resistance 63 detected when the same phase is excited. As shown in FIG. 4A, when the rotor 72 is stopped by excitation, the combined inductance of the excited phase is minimum, and as shown in FIG. 4C, the voltage of the resistance 63 is maximum. Therefore, in this embodiment, the position of the rotor 72 is detected by determining whether or not the voltage value of the resistance 63 is equal to the previously determined maximum value. Note that, alternatively, the position of the rotor 72 can be detected by detecting a previously measured feature value which can be distinguished from other values, instead of the maximum value. Still alternatively, a current may be caused to flow through a predetermined excitation phase to measure the voltage of the resistance 63 each time the rotor 72 is moved, and based on the maximum value, the position of the rotor 72 may be detected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-244330, filed on Nov. 26, 2013, which is hereby incorporated by reference herein in its entirety.

What is claimed is:

1. A motor control apparatus comprising:
a supply unit configured to supply a current for excitation to a plurality of coils of a motor;
a first detection unit configured to detect a physical quantity which varies depending on a change in inductance of at least one of the plurality of coils;
a determination unit configured to determine a rotational position of a rotor of the motor based on the physical quantity detected by the first detection unit;
a control unit configured to control the rotational position of the rotor of the motor based on a determination result by the determination unit, and
a second detection unit configured to detect an induced voltage of each of the plurality of coils, wherein
the determination unit is further configured to determine the rotational position of the rotor based on the physical quantity detected by the first detection unit when the rotor is at rest and when a rotational speed of the rotor is smaller than or equal to a predetermined value, and determine the rotational position of the rotor based on the induced voltage detected by the second detection unit when the rotational speed of the rotor is greater than the predetermined value.

2. The motor control apparatus according to claim 1, wherein
the determination unit is further configured to determine the rotational speed of the rotor based on the induced voltage detected by the second detection unit.

3. The motor control apparatus according to claim 1, wherein
the physical quantity detected by the first detection unit is a rise rate of a current flowing through the coil.

4. The motor control apparatus according to claim 3, wherein
the first detection unit is further configured to measure the rise rate of the current flowing through the coil by measuring a value of the current after a predetermined period of time has elapsed since application of a voltage to the coil.

5. The motor control apparatus according to claim 4, wherein
the period of time during which the first detection unit applies a voltage to the coil is a period of time which the rotor is not rotated.

6. The motor control apparatus according to claim 1, further comprising:
a storage unit configured to store information indicating a relationship between the rotational position of the rotor and the physical quantity detected by the first detection unit,
wherein the determination unit is further configured to use the information stored in the storage unit to determine the rotational position of the rotor.

7. The motor control apparatus according to claim 6, further comprising:
a measurement unit configured to measure the physical quantity detected by the first detection unit for each rotational position of the rotor, to generate information indicating a relationship between the rotational position of the rotor and the physical quantity detected by the first detection unit, and to cause the storage unit to store the generated information.

8. The motor control apparatus according to claim 1, wherein
the determination unit is further configured to detect a change in the rotational position of the rotor based on a change in the physical quantity detected by the first detection unit.

9. The motor control apparatus according to claim 1, wherein
the determination unit is further configured to detect a change in the rotational position of the rotor based on a change in the physical quantity of a predetermined one of the plurality of coils detected by the first detection unit.

10. The motor control apparatus according to claim 1, wherein
the determination unit is further configured to detect a change in the rotational position of the rotor based on the physical quantity of a predetermined one of the plurality of coils detected by the first detection unit.

11. The motor control apparatus according to claim 1, wherein
the determination unit is further configured to, when receiving a reference pulse, determine the rotational position of the rotor of the motor.

12. The motor control apparatus according to claim 1, wherein
the control unit is further configured to, when causing the determination unit to determine the rotational position of the rotor of the motor, set a drive torque to a first torque for the determination, and when controlling the rotational position of the rotor of the motor, set the drive torque to a second torque for movement which is greater than the first torque in order to move the rotor of the motor.

13. The motor control apparatus according to claim 12, wherein
the control unit is further configured to, after moving the rotor of the motor, when causing the determination unit to determine the rotational position of the rotor of the motor again, change the drive torque from the second torque to the first torque.

14. The motor control apparatus according to claim 1, wherein
the control unit is further configured to cause the determination unit to end the determination when the rotor of the motor has been moved to a predetermined position based on the result of the determination by the determination unit.

15. An image forming apparatus comprising:
a motor;
a rotating member configured to be rotated by the motor for formation of an image; and
a motor control apparatus,
wherein the motor control apparatus comprises:
a supply unit configured to supply a current for excitation to a plurality of coils of a motor;
a first detection unit configured to detect a physical quantity which varies depending on a change in inductance of at least one of the plurality of coils;
a determination unit configured to determine a rotational position of a rotor of the motor based on the physical quantity detected by the first detection unit;
a control unit configured to control the rotational position of the rotor of the motor based on a determination result by the determination unit, and
a second detection unit configured to detect an induced voltage of each of the plurality of coils, wherein
the determination unit is further configured to determine the rotational position of the rotor based on the physical quantity detected by the first detection unit when the rotor is at rest and when a rotational speed of the rotor is smaller than or equal to a predetermined value, and determine the rotational position of the rotor based on the induced voltage detected by the second detection unit when the rotational speed of the rotor is greater than the predetermined value.

16. A motor control apparatus comprising:
a supply unit configured to supply a current for excitation to a plurality of coils of a motor;
a detection unit configured to detect a physical quantity which varies depending on a change in inductance of at least one of the plurality of coils;
a determination unit configured to determine a rotational position of a rotor of the motor based on the physical quantity detected by the first detection unit; and
a control unit configured to control the rotational position of the rotor of the motor based on a determination result by the determination unit,
wherein the physical quantity detected by the first detection unit is a rise rate of a current flowing through the coil, and
the detection unit is further configured to measure the rise rate of the current flowing through the coil by measuring a value of the current after a predetermined period of time has elapsed since application of a voltage to the coil.

17. A motor control apparatus comprising:
a supply unit configured to supply a current for excitation to a plurality of coils of a motor;
a detection unit configured to detect a physical quantity which varies depending on a change in inductance of at least one of the plurality of coils;
a determination unit configured to determine a rotational position of a rotor of the motor based on the physical quantity detected by the first detection unit; and
a control unit configured to control the rotational position of the rotor of the motor based on a determination result by the determination unit, wherein
the control unit is further configured to, when causing the determination unit to determine the rotational position of the rotor of the motor, set a drive torque to a first torque for the determination, and when controlling the rotational position of the rotor of the motor, set the drive torque to a second torque for movement which is greater than the first torque in order to move the rotor of the motor.

18. A motor control apparatus comprising:
a supply unit configured to supply a current for excitation to a plurality of coils of a motor;
a detection unit configured to detect a physical quantity which varies depending on a change in inductance of at least one of the plurality of coils;
a determination unit configured to determine a rotational position of a rotor of the motor based on the physical quantity detected by the first detection unit; and
a control unit configured to control the rotational position of the rotor of the motor based on a determination result by the determination unit, wherein
the control unit is further configured to cause the determination unit to end the determination when the rotor of the motor has been moved to a predetermined position based on the result of the determination by the determination unit.

* * * * *